US011075927B2

(12) United States Patent
Fujimura et al.

(10) Patent No.: US 11,075,927 B2
(45) Date of Patent: *Jul. 27, 2021

(54) FRAUD DETECTION ELECTRONIC CONTROL UNIT, ELECTRONIC CONTROL UNIT, AND NON-TRANSITORY RECORDING MEDIUM IN WHICH COMPUTER PROGRAM IS DESCRIBED

(71) Applicant: Panasonic Intellectual Property Management Co., Ltd., Osaka (JP)

(72) Inventors: Kazuya Fujimura, Nara (JP); Jun Anzai, Kanagawa (JP); Masato Tanabe, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

This patent is subject to a terminal disclaimer.

(21) Appl. No.: 16/451,388

(22) Filed: Jun. 25, 2019

(65) Prior Publication Data

US 2019/0312895 A1 Oct. 10, 2019

Related U.S. Application Data

(63) Continuation of application No. PCT/JP2017/043721, filed on Dec. 6, 2017.

(30) Foreign Application Priority Data

Jan. 13, 2017 (JP) .............................. JP2017-004593

(51) Int. Cl.
*H04L 29/06* (2006.01)
*B60R 16/023* (2006.01)
(Continued)

(52) U.S. Cl.
CPC .......... *H04L 63/1416* (2013.01); *B60R 16/02* (2013.01); *B60R 16/023* (2013.01); *H04L 12/28* (2013.01); *H04L 12/40* (2013.01)

(58) Field of Classification Search
USPC .......................................................... 726/23
See application file for complete search history.

(56) References Cited

U.S. PATENT DOCUMENTS 8,607,346 B1 * 12/2013 Hedge ................. H04L 63/1416
726/23
2015/0135262 A1 * 5/2015 Porat ..................... G06F 21/554
726/1
(Continued)

FOREIGN PATENT DOCUMENTS

JP  2006-343836 A     12/2006
JP  2007181061 A  *   7/2007
(Continued)

OTHER PUBLICATIONS

Candrlic et al., "A Comparison and the Desireable Features of Version Control Tools", ITI 2007 29th Int. Conf. on Information Technology Interfaces, pp. 121-126 (Year: 2007).*
(Continued)

*Primary Examiner* — Khalil Naghdali
(74) *Attorney, Agent, or Firm* — Greenblum & Bernstein, P.L.C.

(57) ABSTRACT

A fraud detection electronic control unit is connected to an electronic control unit through an in-vehicle network system. The fraud detection electronic control unit includes a storage and a determination unit. The storage stores a first regulation for determining whether the frame transmitted from the electronic control unit is fraudulent. The determination unit determines whether the frame transmitted from the electronic control unit is fraudulent in pursuant to the first regulation. When a predetermined condition is satisfied, (Continued)

the storage acquires a second regulation retained by the electronic control unit and updates the stored first regulation.

4 Claims, 8 Drawing Sheets

(51) Int. Cl.
*H04L 12/40* (2006.01)
*B60R 16/02* (2006.01)
*H04L 12/28* (2006.01)

(56) References Cited

U.S. PATENT DOCUMENTS

2017/0013006 A1 1/2017 Ujiie et al.
2017/0026386 A1 1/2017 Unagami et al.
2017/0147812 A1 5/2017 Ujiie et al.

FOREIGN PATENT DOCUMENTS

WO 2015/151418 10/2015
WO 2015/159520 10/2015
WO 2016/116976 A1 7/2016

OTHER PUBLICATIONS

International Search Report of PCT application No. PCT/JP2017/043721 dated Feb. 27, 2018.
Japanese Office Action from Japan Patent Office (JPO) dated Dec. 8, 2020 for the related Japanese Patent Application No. 2017-004593.

* cited by examiner

| Fraud determination rule ||
|---|---|
| Frame ID | ID value |

52 {
| Frame data length | Range of possible value |
|---|---|
| Transmission period | Range of possible period |
| Transmission frequency | Range of possible frequency |

54 {
| Reference frame information | Information about data of another frame, information being referred to in this rule |
|---|---|
| Reference determination rule element | Determination regulation defined using reference frame information |
| Reference determination rule arithmetic expression | Arithmetic expression used to obtain determination result |
| Determination rule reference data information | Information about data of this frame, information being referred to in another frame |

| ECU model number | Value of model number |
|---|---|
| Version number | Major version number and minor version number |
| Falsification detecting check value | Hash value, MAC data, and the like |

FRAUD DETECTION ELECTRONIC CONTROL UNIT, ELECTRONIC CONTROL UNIT, AND NON-TRANSITORY RECORDING MEDIUM IN WHICH COMPUTER PROGRAM IS DESCRIBED

TECHNICAL FIELD

The present invention relates to a data processing technique, particularly to a fraud detection electronic control unit, an electronic control unit, an in-vehicle network system, a fraud detection method, and a computer program.

BACKGROUND ART

Recently, many electronic control units (hereinafter, referred to as ECUs) are disposed in a vehicle. A network connecting the ECUs is called an in-vehicle network system. Many standards exist in the in-vehicle network system, and a CAN (controller area network) can be cited as the widely spread standard.

A method for monitoring a frame flowing on the in-vehicle network system using a fraud detection ECU connected to the in-vehicle network system has been proposed in order to detect the connection of the fraudulent ECU on the in-vehicle network system (for example, see PTL 1).

CITATION LIST

Patent Literature

PTL 1: International Publication No. 2015/159520

SUMMARY OF THE INVENTION

The present invention provides a technique of easily improving the security of the in-vehicle network system.

According to an aspect of the present invention, a fraud detection electronic control unit is connected to an electronic control unit through an in-vehicle network system. The fraud detection electronic control unit includes a storage and a determination unit. The storage stores a first regulation in order to determine whether a frame transmitted from an electronic control unit is fraudulent. The determination unit determines whether the frame transmitted from the electronic control unit is fraudulent in pursuant to the first regulation. When a predetermined condition is satisfied, the storage acquires a second regulation retained by the electronic control unit and updates the stored first regulation.

According to another aspect of the present invention, an electronic control unit is connected to a fraud detection electronic control unit through an in-vehicle network system. The electronic control unit includes a storage and a transmission and reception unit. The storage stores the regulation for determining whether a frame transmitted onto the in-vehicle network system is fraudulent, the frame having the same frame ID (identification) as a frame transmitted from the electronic control unit. The transmission and reception unit receives a regulation transmission request from the fraud detection electronic control unit. The transmission and reception unit transmits the regulation stored in the storage to the fraud detection electronic control unit in response to the regulation transmission request, the regulation being used in order that the fraud detection electronic control unit determines whether the frame of the same frame ID as the frame transmitted from the electronic control unit is fraudulent.

According to still another aspect of the present invention, the in-vehicle network system includes an electronic control unit and a fraud detection electronic control unit connected to the electronic control unit through an in-vehicle network system. The fraud detection electronic control unit includes a first storage, a determination unit, and a first transmission and reception unit. The first storage stores a first regulation in order to determine whether a frame transmitted from the electronic control unit is fraudulent. The determination unit determines whether the frame transmitted from the electronic control unit is fraudulent in pursuant to the first regulation. When a predetermined condition is satisfied, the first transmission and reception unit transmits a second regulation transmission request to the electronic control unit. When the predetermined condition is satisfied, the first storage acquires a second regulation retained by the electronic control unit and updates the stored first regulation. The electronic control unit includes a second storage and a second transmission and reception unit. The second storage stores the second regulation for determining whether a frame transmitted onto the in-vehicle network system is fraudulent, the frame having the same frame ID as a frame transmitted from the electronic control unit. The second transmission and reception unit receives the second regulation transmission request, and transmits the second regulation previously stored in the second storage to the fraud detection electronic control unit in response to the second regulation transmission request.

According to still another aspect of the present invention, a fraud detection method is performed by a fraud detection electronic control unit connected to an electronic control unit through an in-vehicle network system, the fraud detection electronic control unit storing, in a storage, a regulation for determining whether a frame transmitted from the electronic control unit is fraudulent. The fraud detection method includes determining whether a frame transmitted from the electronic control unit is fraudulent in pursuant to a first regulation. The fraud detection method includes acquiring a second regulation retained by the electronic control unit and updating the first regulation stored in the storage when a predetermined condition is satisfied.

According to still another aspect of the present invention, a fraud detection method is performed by an electronic control unit connected to a fraud detection electronic control unit through an in-vehicle network system, the electronic control unit storing, in a storage, a regulation for determining whether a frame of the same frame ID as a frame transmitted from the electronic control unit is fraudulent. The fraud detection method includes receiving a regulation transmission request from the fraud detection electronic control unit. The fraud detection method includes transmitting the regulation stored in the storage to the fraud detection electronic control unit in response to the regulation transmission request, the regulation being used in order that the fraud detection electronic control unit determines whether the frame transmitted from the electronic control unit is fraudulent.

A combination of the above components and other components, a computer program, a recording medium in which the computer program is recorded, and a vehicle including the device are still effective as other aspects of the present invention.

The present invention can easily improve the security of the in-vehicle network system.

BRIEF DESCRIPTION OF DRAWINGS

FIG. 3 is a view illustrating a configuration of a fraud determination rule.

DESCRIPTION OF EMBODIMENT

A problem found in the conventional technique will briefly be described prior to description of an exemplary embodiment of the present invention. In the method of PTL 1, the fraud detection ECU determines whether the frame transmitted from another ECU is fraudulent based on a previously defined fraud determination rule. For this reason, it is necessary to previously store the fraud determination rule corresponding to a type of the ECU connected to an in-vehicle network system in the fraud detection ECU. However, individual adjustment of the fraud determination rule stored in the fraud detection ECU is difficult to perform according to the type of the ECU connected to the in-vehicle network system, or due to repair replacement of the ECU or update of firmware, and there is room for improvement.

An outline of the exemplary embodiment will be described prior to the description of a configuration of the exemplary embodiment. Sometimes the fraud detection ECU determines whether the frame transmitted from another ECU (in other words, an ECU that is an inspection target to be inspected, also referred to as an inspection target ECU) is fraudulent in order to detect that the fraudulent ECU is connected on the in-vehicle network system. It is necessary to individually adjust the fraud determination rule stored in the fraud detection ECU according to the type of the inspection target ECU connected to the in-vehicle network system. Conventionally, sometimes management of the fraud detection ECU and the fraud determination rule becomes troublesome. In the case that the fraud determination rule changes due to the repair replacement of the inspection target ECU or the update of firmware, it is also necessary to correctly change the fraud determination rule retained by the fraud detection ECU. However, conventionally the management of the update is not easy to maintain.

In an in-vehicle network system of the exemplary embodiment, the inspection target ECU retains the fraud determination rule in order to inspect the frame having the same frame ID as the frame transmitted by itself, and the inspection target ECU presents the fraud determination rule to the fraud detection ECU. The fraud detection ECU determines whether the frame transmitted from each inspection target ECU is fraudulent based on the fraud determination rule presented by the inspection target ECU.

Figure 1:
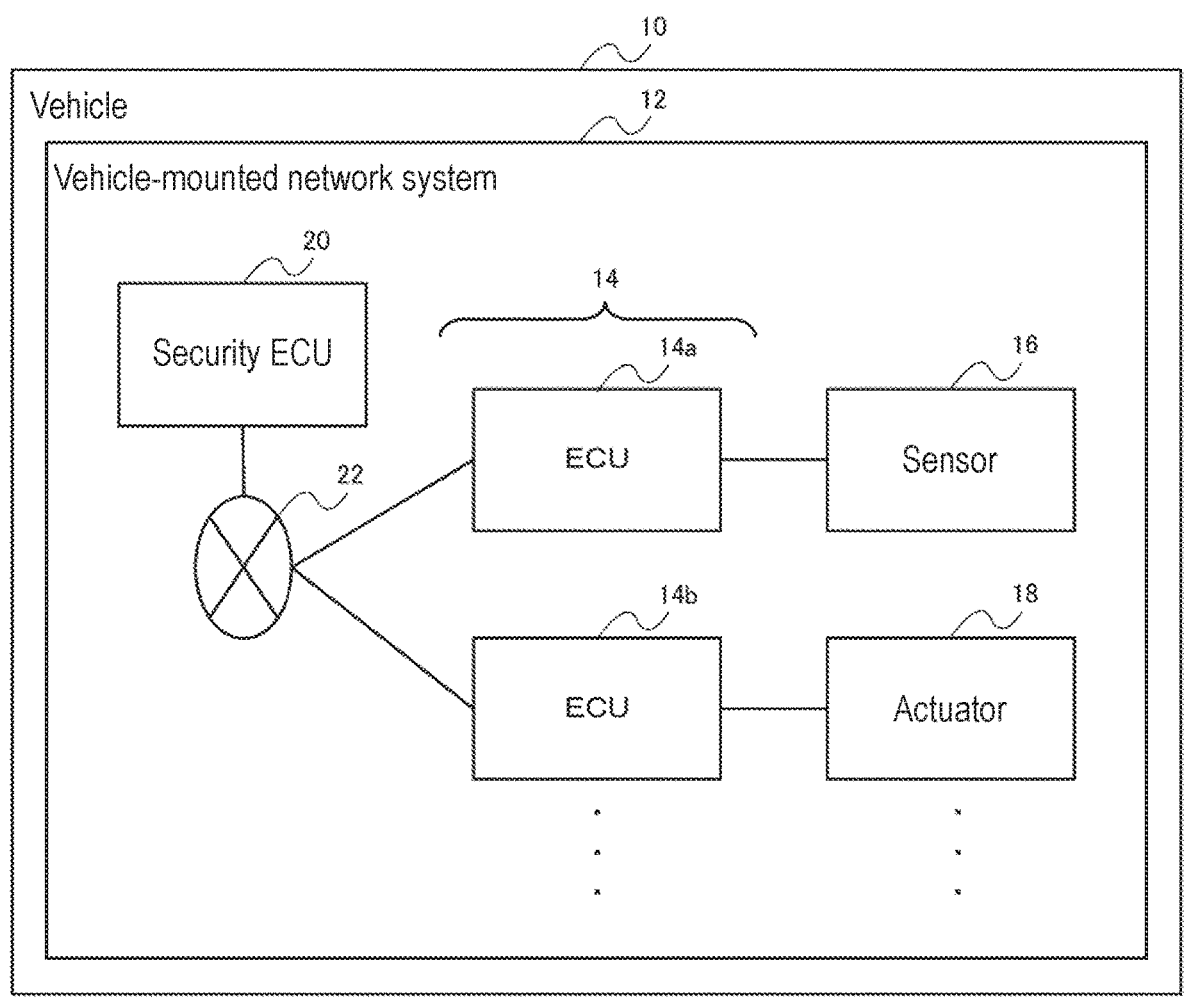
FIG. 1 is a view illustrating a configuration of an in-vehicle network system according to an exemplary embodiment.

FIG. 1 illustrates a configuration of the in-vehicle network system of the exemplary embodiment. Vehicle-mounted network system 12 is a communication system constructed in vehicle 10, and includes ECU 14a, ECU 14b (hereinafter, generally referred to as ECU 14) and security ECU 20. ECU 14 and security ECU 20 are connected through CAN 22, and transmit and receive the frame in pursuant to a CAN protocol.

ECU 14a and ECU 14b correspond to the inspection target ECU. ECU 14a is connected to sensor 16 such as a speed sensor and a window open or closed sensor, and transmits information, such as the frame indicating a vehicle speed and a window open or closed state, which is detected by sensor 16, to CAN 22. ECU 14b is connected to actuator 18 (such as a brake actuator), and controls actuator 18 based on the frame received from CAN 22. ECU 14b transmits the frame indicating a state of actuator 18 to security ECU 20 through CAN 22.

Security ECU 20 corresponds to the fraud detection ECU. Security ECU 20 determines whether the inspection target ECU that transmits the fraudulent frame is connected to CAN 22 based on whether a plurality of frames transmitted from a plurality of ECUs 14 are fraudulent.

Figure 2:
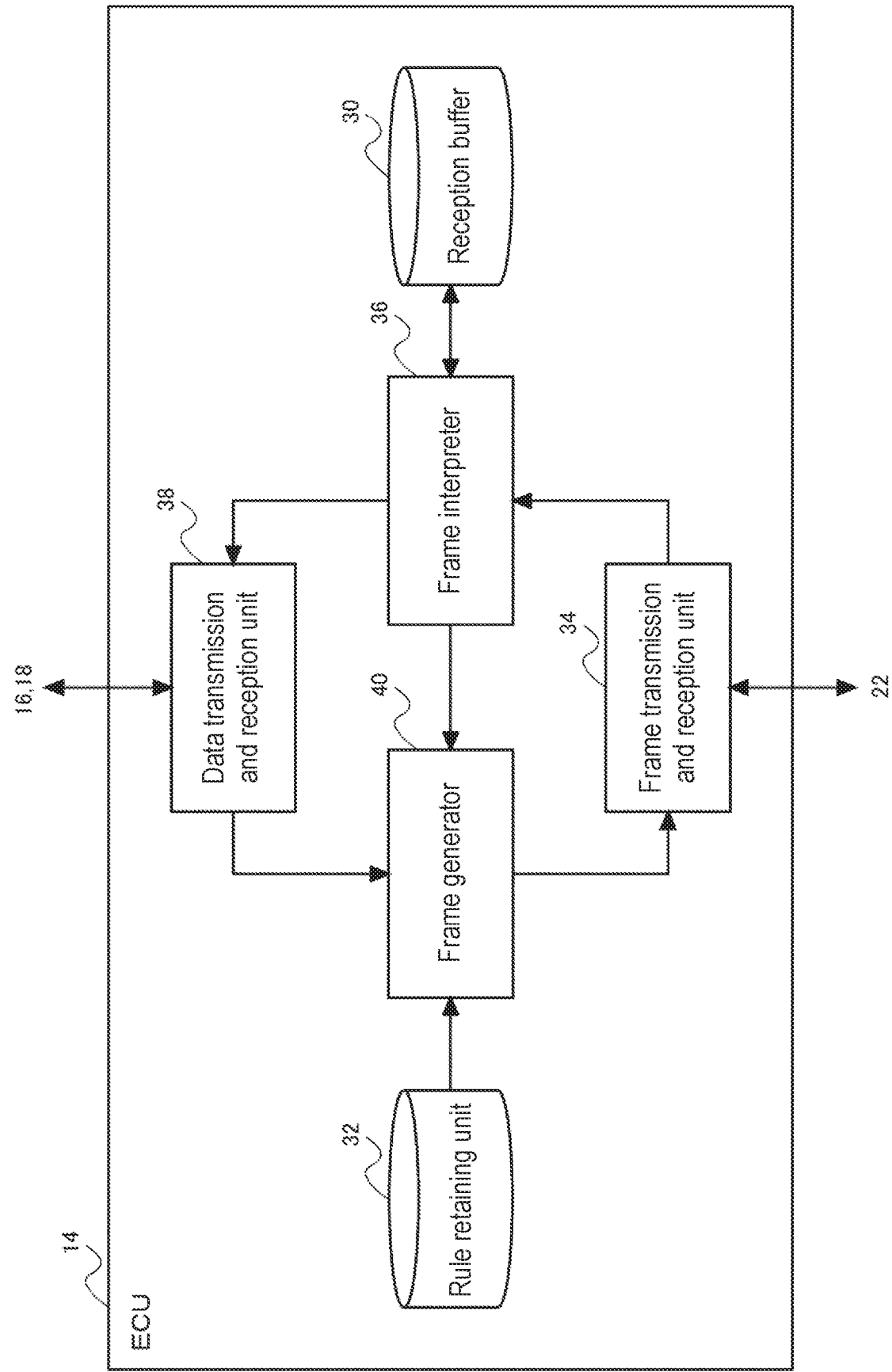
FIG. 2 is a block diagram illustrating a functional configuration of an ECU in FIG. 1.

FIG. 2 is a block diagram illustrating a functional configuration of ECU 14 in FIG. 1. ECU 14 includes reception buffer 30, rule-retaining unit 32, frame transmission and reception unit 34, frame interpreter 36, data transmission and reception unit 38, and frame generator 40. Each block illustrated in the block diagrams of the description can be constructed with an element or a mechanical device including a central processing unit (CPU) and a memory of a computer in a hardware manner or a computer program in a software manner. In this case, a functional block constructed with cooperation of the hardware and the software is illustrated in the block diagrams. Those skilled in the art understand that the functional block is constructed with a combination of the hardware and the software in many ways.

For example, a computer program including modules corresponding to frame transmission and reception unit 34, frame interpreter 36, data transmission and reception unit 38, and frame generator 40 may be stored in a read-only memory (ROM) of ECU 14. The CPU of ECU 14 may exert a function of each block by appropriately reading the computer program on a random-access memory (RAM) of ECU 14. Reception buffer 30 and rule-retaining unit 32 may be constructed with the ROM or RAM of ECU 14. Alternatively, the functional block may be constructed with a large-scale integration (LSI) that is a physically dedicated circuit.

Reception buffer 30 is a storage area in which frame data received from CAN 22 is temporarily stored. Rule retaining unit 32 is a storage area in which a fraud determination rule is stored. The fraud determination rule retained by rule-retaining unit 32 is data in which a reference or a regulation is defined in order to determine whether the frame having the same frame ID as the frame (such as a remote frame and a data frame of the CAN) transmitted from own ECU 14 (that is, own device) is fraudulent.

FIG. 3 illustrates a configuration of the fraud determination rule. Fraud determination rule 50 includes the frame ID, individual determination rule 52, external reference determination rule 54, an ECU model number, a version number, and a falsification detecting check value. An ID value provided to the target frame determined by fraud determination rule 50 is set to the frame ID. In the exemplary embodiment, the unique frame ID is defined in each type of the frame and each ECU 14 of a frame transmission source, An identifier of ECU 14 that is an original source of fraud determination rule 50 is set to the ECU model number. A version number of fraud determination rule 50 is set to the version number. In the exemplary embodiment, both a major version number and a minor version number are set to the version number. Message authentication code (MAC) data that is generated based on a predetermined common key and data of fraud determination rule 50 may be set to the falsification detecting check value, or a fraud determination rule in which fraud determination rule 50 subjected to general digital signature may be set to the falsification detecting check value.

A rule relating to the frame transmitted by ECU 14 (for example, ECU 14*a*) that is the original source of fraud determination rule 50 is common to individual determination rule 52 and external reference determination rule 54. Individual determination rule 52 and external reference determination rule 54 are different from each other in that a fraud determination condition of individual determination rule 52 relates only to the frame transmitted by ECU 14 (for example, ECU 14*a*). On the other hand, the fraud determination condition of external reference determination rule 54 relates to not only the frame transmitted by ECU 14 (for example, ECU 14*a*) but also the frame transmitted by another ECU (for example, ECU 14*b*).

Individual determination rule 52 includes a frame data length, a transmission period, and a transmission frequency. The frame data length designates a value or a range that can be taken as a data length of the frame. Fraud determination unit 70 (see FIG. 4) of security ECU 20 (to be described later) determines that the frame having the data length that deviates from the designated value or range is fraudulent. For example, an upper limit and a lower limit may be designated as a setting value of the frame data length.

A period in which the frame having the frame ID appears on CAN 22 is designated to the transmission period. Fraud determination unit 70 of security ECU 20 stores a previous appearance time (a reception time from CAN 22) of the frame having the frame ID, and determines that the frame is fraudulent in the case that a difference from a current appearance time deviates from the transmission period. For example, an upper limit and a lower limit of the period including a margin may be designated as a setting value of the transmission period.

A frequency at which the frame having the frame ID appears on CAN 22 is designated to the transmission frequency. Fraud determination unit 70 of security ECU 20 counts the number of appearance times (the number of reception times from CAN 22) until a predetermined unit time elapses from a certain time, and determined that the frame is fraudulent in the case that a count value deviates from the designated range of the transmission frequency. For example, an upper limit and a lower limit of the number of appearance times may be designated as a setting value of the transmission frequency. In the fraud determination using individual determination rule 52, whether the value of each of the frame data length, the transmission period, and the transmission frequency deviates from the designated range is determined, and the fraudulent frame is determined when at least one of the frame data length, the transmission period, and the transmission frequency deviates from the designated range. Individual determination rule 52 is not limited to the rule described above, but may include another rule relating to the frame transmitted from ECU 14.

External reference determination rule 54 includes reference frame information, a reference determination rule element, a reference determination rule arithmetic expression, and determination rule reference data information. Information about data of another frame, which is referred to in the rule, is set to the reference frame information. The reference frame information includes a determination rule reference data identifier as an internal parameter, and a plurality of determination rule reference data identifiers can be set. An identifier (such as a name or ID of a data item) of determination rule reference data used in the reference determination rule element is designated to the determination rule reference data identifier.

A determination regulation (in other words, fraud determination reference) to the data of the item designated by the reference frame information is set to the reference determination rule element. The reference determination rule element includes a set of the reference frame information, the determination condition, and the determination reference value as an internal parameter, and a plurality of sets can be set. The identifier (for example, an index value) of the specific reference frame information that is referred to in a certain rule element is designated to the reference frame information. A type of the determination condition, which is performed using the determination rule reference data and determination reference value that are designated by the specific reference frame information, is designated to the determination condition. The type of the determination condition includes "equal", "larger", and "smaller". A reference value used in the determination is designated to the determination reference value. The determination reference value may be the identifier of the second reference frame information in addition to the designation of a numerical value. In this case, the determination rule reference data retained by the second reference frame information is used as the determination reference value. That is, the determination rule reference data and the determination reference value that are retained by the reference frame information are compared to each other to determined whether the determination condition is satisfied, thereby obtaining a true or false value of the reference determination rule element.

An arithmetic expression is set to the reference determination rule arithmetic expression in order to obtain a determination result. The reference determination rule arithmetic expression includes a set of an operator and the reference determination rule element as the internal parameter, and a plurality of sets can be set. An operator coupling the reference determination rule element is designated to the operator. The reference determination rule element that is a coupling target is designated to the reference determination rule element. That is, in the reference determination rule arithmetic expression, the individual true or false value retained by the individual reference determination rule element is coupled by the operator, and the arithmetic expression is designated in order to obtain the final determination result. The arithmetic expression may be described and stored by inverted Polish notation.

Information about the determination rule reference data that can be designated by another frame is set to the determination rule reference data information. The determination rule reference data information includes a set of the determination rule reference data identifier and a determination rule reference data position as the internal parameter, and a plurality of sets can be set. A value, which is the identifier (such as a data item name and an ID) of the frame data that can be referred to by another frame and is unique in in-vehicle network system 12, is designated to the determination rule reference data identifier A position of the data identified by the determination rule reference data identifier is designated to the determination rule reference data position. In other words, the position that is referred to by another frame in a data block included in the frame (the frame specified by the frame ID) is designated to the determination rule reference data position by a byte offset and a bit position. That is, the determination rule reference data information defines the position of the data block in the that can be referred to by another frame and the identifier of the data block, and is information that can be designated by the reference frame information about another frame. External reference determination rule 54 is not limited to the rule described above, but may include another rule relating to the frame transmitted from another ECU.

Referring to FIG. 2, frame transmission and reception unit 34 transmits and receives the frame to and from CAN 22 in pursuant to the CAN protocol. Frame transmission and reception unit 34 receives the data of the frame from CAN 22 bit by bit, and transmits the received data to frame interpreter 36. Frame transmission and reception unit 34 transmits the frame output from frame generator 40 to CAN 22.

Frame interpreter 36 acquires the data of the frame from frame transmission and reception unit 34 bit by bit, and interprets the data in pursuant to the CAN protocol. When determining that the acquired data is not pursuant to the CAN protocol, frame interpreter 36 notifies frame generator 40 of an instruction to transmit an error frame even before frame interpreter 36 receives the data for one frame. When the acquired data is pursuant to the CAN protocol, frame interpreter 36 stores the acquired data in reception buffer 30.

In the case that the frame ID is a predetermined value that is a processing target while the reception of one frame is completed, frame interpreter 36 performs processing on the different frame in each type of the ECU. In the processing of the frame, frame interpreter 36 transmits the data to be transmitted to sensor 16 or actuator 18 frame to data transmission and reception unit 38 as needed. Frame interpreter 36 clears reception buffer 30 when the processing of one frame is completed.

Data transmission and reception unit 38 transmits the data received from frame interpreter 36 to sensor 16 or actuator 18 that is connected to ECU 14. Data transmission and reception unit 38 transmits the data received from sensor 16 or actuator 18 to frame generator 40.

Frame generator 40 receives the data from data transmission and reception unit 38, and generates the frame in pursuant to the CAN protocol. For example, frame generator 40 generates the frame in which the frame ID is set according to the type of the data received from data transmission and reception unit 38, the frame including at least part of the data received from data transmission and reception unit 38. Frame generator 40 transmits the generated frame to frame transmission and reception unit 34. In the case that frame generator 40 receives the instruction to transmit the error frame from frame interpreter 36, frame generator 40 generates the error frame, and transmits the frame error to frame transmission and reception unit 34.

A characteristic configuration of ECU 14 of the exemplary embodiment will be described. Frame transmission and reception unit 34 and frame interpreter 36 cooperate with each other to function as a reception unit that receives a request data requesting the transmission of fraud determination rule 50 from security ECU 20. Specifically, frame interpreter 36 transmits an instruction to transmit main data of fraud determination rule 50 to frame generator 40 in the case that the ID of the frame received from CAN 22 through frame transmission and reception unit 34 is a first predetermined value requesting the main data of fraud determination rule 50. Frame interpreter 36 transmits an instruction to transmit version information about fraud determination rule 50 to frame generator 40 in the case that the ID of the received frame is a second predetermined value requesting the version information about fraud determination rule 50.

Frame generator 40 and frame transmission and reception unit 34 cooperate with each other to function as a transmission unit that transmits fraud determination rule 50 retained by rule-retaining unit 32 to security ECU 20 in response to the request data received by the reception unit. Specifically, frame generator 40 generates the frame including the whole data of fraud determination rule 50 retained by rule-retaining unit 32 in the case that frame generator 40 receives the instruction to transmit the main data of fraud determination rule 50 from frame interpreter 36. Frame transmission and reception unit 34 transmits the frame including the whole data of fraud determination rule 50 to CAN 22.

Frame generator 40 generates the frame including only the version information about fraud determination rule 50 retained by rule-retaining unit 32 in the case that frame generator 40 receives the instruction to transmit the version information about fraud determination rule 50 from frame interpreter 36. Frame transmission and reception unit 34 transmits the frame including the version information about fraud determination rule 50 to CAN 22.

Figure 4:
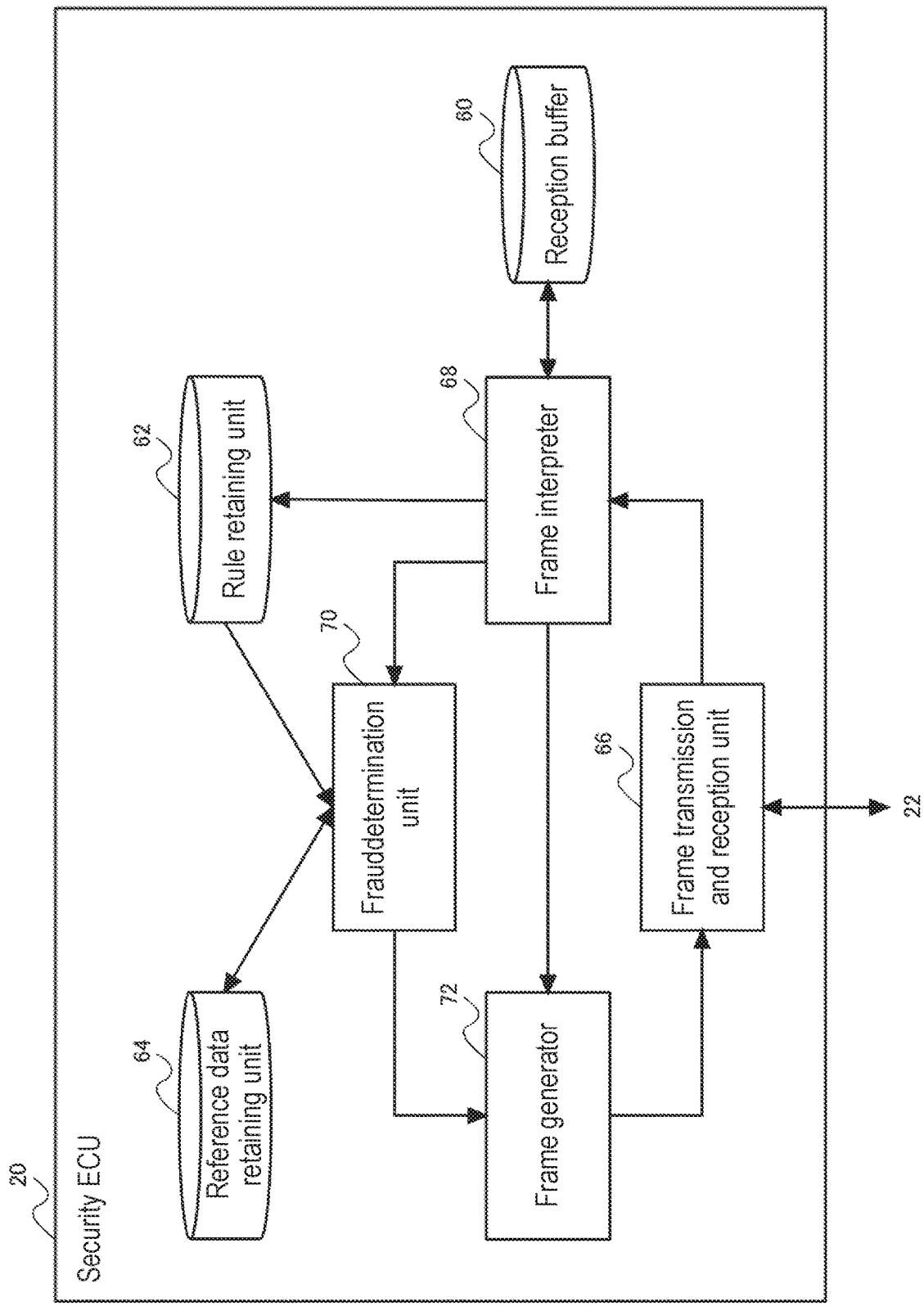
FIG. 4 is a block diagram illustrating a functional configuration of a security ECU in FIG. 1.

FIG. 4 is a block diagram illustrating a functional configuration of security ECU 20 in FIG. 1. Security ECU 20 includes reception buffer 60, rule-retaining unit 62, reference data retaining unit 64, frame transmission and reception unit 66, frame interpreter 68, fraud determination unit 70, and frame generator 72. Reception buffer 60, frame transmission and reception unit 66, frame interpreter 68, and frame generator 72 of security ECU 20 correspond to reception buffer 30, frame transmission and reception unit 34, frame interpreter 36, and frame generator 40 of ECU 14 in FIG. 2. In the functional blocks, the configuration of the already described functional block will be omitted.

Rule retaining unit 62 includes a storage area in which the fraud determination rule (FIG. 3) determining whether the frame transmitted from external ECU 14 is fraudulent is stored. Rule retaining unit 62 retains the fraud determination rule provided from each of a plurality of ECUs 14 in the in-vehicle network system 12 while correlating the fraud determination rule with each ECU 14. In other words, rule-retaining unit 62 retains the fraud determination rule for each ECU in order to determine whether the frame having the same frame ID as the frame transmitted from each ECU.

Specifically, rule-retaining unit 62 receives an updating fraud determination rule transmitted from frame interpreter 68, and newly stores the updating fraud determination rule in a predetermined storage area while correlating the updating fraud determination rule with an ECU model number included in the updating fraud determination rule. Rule retaining unit 62 updates the existing fraud determination rule using the updating fraud determination rule in the case that rule-retaining unit 62 already stores the existing fraud determination rule while correlating the existing fraud determination rule with the ECU model number included in the updating fraud determination rule.

Rule retaining unit 62 further performs version value checking processing and falsification checking processing during new storage or update of the fraud determination rule. Rule retaining unit 62 transmits the fraud determination rule corresponding to the frame ID received from fraud determination unit 70 to fraud determination unit 70.

Processing of managing the version of the fraud determination rule in the exemplary embodiment will be described. As partially described above, rule-retaining unit 62 retains the ECU model number, the fraud determination rule, the major version number, and the minor version number of each of the plurality of ECUs 14 in a form that prevents the falsification. Each ECU 14 transmits the fraud determination rule to which the ECU model number, the major version number, and the minor version number are provided to security ECU 20. Rule retaining unit 62 compares the major version number acquired from ECU 14 and the major version number previously retained by rule-retaining unit 62 with respect to the fraud determination rule corresponding to the ECU model number acquired from ECU 14.

In the case that the major version numbers of the fraud determination rules are not matched with each other, rule-retaining unit 62 newly stores the fraud determination rule acquired from ECU 14 in rule-retaining unit 62. Alternatively, rule-retaining unit 62 updates, namely, replaces the existing fraud determination rule of rule-retaining unit 62 using the fraud determination rule acquired from ECU 14. In the case that the major version numbers of the fraud determination rules are not matched with each other, rule-retaining unit 62 updates the fraud determination rule of rule-retaining unit 62 irrespective of a magnitude correlation of the major version numbers of the fraud determination rules and a difference between the minor version numbers of the fraud determination rules. Even if the major version number acquired from ECU 14 is older than the major version number previously retained by rule-retaining unit 62, rule-retaining unit 62 updates the fraud determination rule of rule-retaining unit 62. For example, rule-retaining unit 62 replaces the existing data of rule-retaining unit 62, which is correlated with the ECU model number acquired from ECU 14, with the fraud determination rule, the major version number, and the minor version number that are acquired from ECU 14.

The mismatch between the major version number retained by ECU 14 and the major version number retained by security ECU 20 is generated in the case that ECU 14 is replaced (for example, the case that ECU 14 is replaced with old-form ECU 14) and the like. When the major versions different from each other, there is a possibility that the individual determination rule and the external reference determination rule change largely. For this reason, desirably the fraud determination rule retained by security ECU 20 is updated according to ECU 14.

In the case that the major version numbers of the fraud determination rules are matched with each other, rule-retaining unit 62 further compares the minor version number acquired from ECU 14 and the minor version number previously retained by rule-retaining unit 62 with respect to the fraud determination rule corresponding to the ECU model number acquired from ECU 14. Rule retaining unit 62 updates the existing fraud determination rule of rule-retaining unit 62 using the fraud determination rule acquired from ECU 14 on a condition that the value of the minor version acquired from ECU 14 is newer than the value of the minor version previously retained by rule-retaining unit 62 (for example, a larger number). This is because there is a low possibility that the fraud determination rule changes largely when the major version numbers of the fraud determination rules are matched with each other, and the newer minor version number is compatible with addition of a newer function and bug correction.

As a modification, a single type of version number that is not divided into the major version number and the minor version number may be correlated with the fraud determination rule. rule-retaining unit 62 of security ECU 20 may update the existing fraud determination rule of rule-retaining unit 62 using the fraud determination rule acquired from ECU 14 in the case that the version number acquired from ECU 14 is newer than the version number previously retained by rule-retaining unit 62 with respect to the fraud determination rule corresponding to the ECU model number acquired from ECU 14.

The falsification checking processing in the exemplary embodiment will be described below. Rule retaining unit 62 of security ECU 20 retains a root CA (Certificate Authority) certificate in the form that prevents the falsification. Each ECU 14 retains a signed ECU certificate in which the signature can be verified by the root CA certificate and the own fraud determination rule signed by a secret key corresponding to the ECU certificate. Each ECU 14 transmits the ECU certificate and the signed fraud determination rule to security ECU 20. Rule retaining unit 62 of security ECU 20 verifies the ECU certificate using the root CA certificate, and verifies the fraud determination rule using the ECU certificate. Rule retaining unit 62 of security ECU 20 updates the fraud determination rule in the case that both the ECU certificate and the fraud determination rule are successfully verified. A typical digital signature algorithm is used in the signature provision and the verification.

Reference data retaining unit 64 retains the data of a second frame referred to in the fraud determination processing performed on a first frame and the identifier (that is, the determination rule reference data identifier) of the second frame while correlating the data of the second frame and the identifier with each other. In other words, reference data retaining unit 64 retains determination rule reference data that is data extracted from the second frame according to determination rule reference data information defined by the fraud determination rule corresponding to the (frame ID of) second frame.

In the case that frame interpreter 68 completes the reception of one frame to interpret the received frame as the updating fraud determination rule based on the ID of the received frame, frame interpreter 68 transmits the received frame to rule-retaining unit 62. In the case that frame interpreter 68 does not interpret the received frame as the updating fraud determination rule, namely, in the case that frame interpreter 68 interprets the received frame as the fraud determination target data, frame interpreter 68 transmits the received frame to fraud determination unit 70. Frame interpreter 68 clears reception buffer 60 when the processing of one frame is completed.

Fraud determination unit 70 determines whether the frame transmitted from the external ECU 14 is fraudulent in pursuant to the fraud determination rule retained by rule-retaining unit 62. Specifically, fraud determination unit 70 transmits the frame ID of the frame (hereinafter, also referred to as determination target frame) received from frame interpreter 68 to rule-retaining unit 62, and acquires the fraud determination rule correlated with the frame ID from rule-retaining unit 62. Fraud determination unit 70 refers to the fraud determination rule acquired from rule-retaining unit 62, and determines whether the determination target frame is fraudulent. When determining that the determination target frame is fraudulent, fraud determination unit 70 notifies frame generator 72 of the instruction to transmit the error frame.

In the case that frame generator 72 receives the instruction to transmit the error frame from frame interpreter 68 or fraud determination unit 70, frame generator 72 generates the error frame in pursuant to the CAN protocol, and transmits the error frame to frame transmission and reception unit 66. In the case that a predetermined condition is satisfied, rule-retaining unit 62 acquires and stores the fraud determination rule retained by another ECU 14. The detailed processing of updating the fraud determination rule will be described later with reference to FIG. 8.

Figure 5:
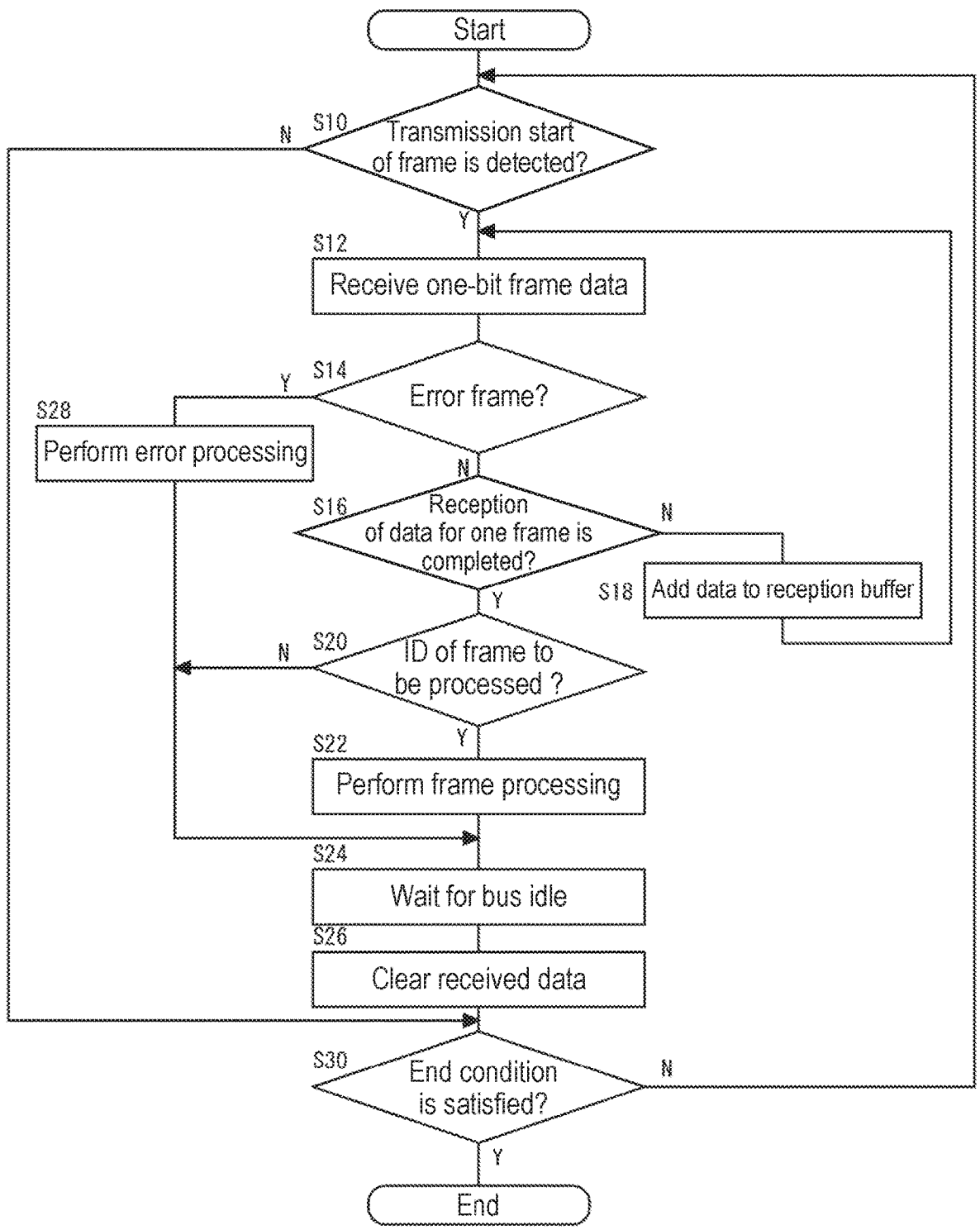
FIG. 5 is a flowchart illustrating operation of the ECU in FIG. 1.

Operation of in-vehicle network system 12 having the above configuration will be described. FIG. 5 is a flowchart illustrating the operation of ECU 14 in FIG. 1. When detecting transmission start of the frame in CAN 22 (Y in S10), frame transmission and reception unit 34 of ECU 14 receives one-bit data of the frame (S12). When the received frame is not the error frame (N in S14), and when the reception of the data for one frame is incomplete (N in S16), frame interpreter 36 adds the received one-bit data to reception buffer 30 (S18), and the operation returns to S12.

When completing the data of one frame (Y in S16), and when the frame ID is the predetermined value indicating the frame to be process by the own ECU (Y in S20), frame interpreter 36 performs data processing based on the received frame (S22). For example, frame interpreter 36 may acquire the data designated by the received remote frame from sensor 16 connected to the own ECU, and transmit the data frame including the acquired data to CAN 22. Frame interpreter 36 may transmit the data designated by the received remote frame to actuator 18, and transmit the data frame including a control result of actuator 18 to CAN 22. As one aspect of the frame processing in S22, frame interpreter 36 and frame generator 40 perform processing of providing the fraud determination rule previously stored in the own ECU to security ECU 20 in the case that the received frame includes the request to transmit the fraud determination rule. The detailed processing of providing the fraud determination rule will be described later with reference to FIG. 8.

When the frame ID of the received frame is not the predetermined value (N in S20), frame interpreter 36 skips the processing in S22, and disposes, for example, the received frame. When the received frame is the error frame (Y in S14), frame interpreter 36 performs predetermined error processing (S28), and disposes, for example, the received frame data. Frame interpreter 36 waits for bus idle of CAN 22 (S24), and clears the received data stored in reception buffer 30 (S26). The flowchart in FIG. 5 is ended when a predetermined end condition such as power off is satisfied (Y in S30), and the operation returns to S10 when the end condition is not satisfied (N in S30). When the transmission start of the frame is undetected (N in S10), the operation skips S12 to S28 to go to the determination in S30

Figure 6:
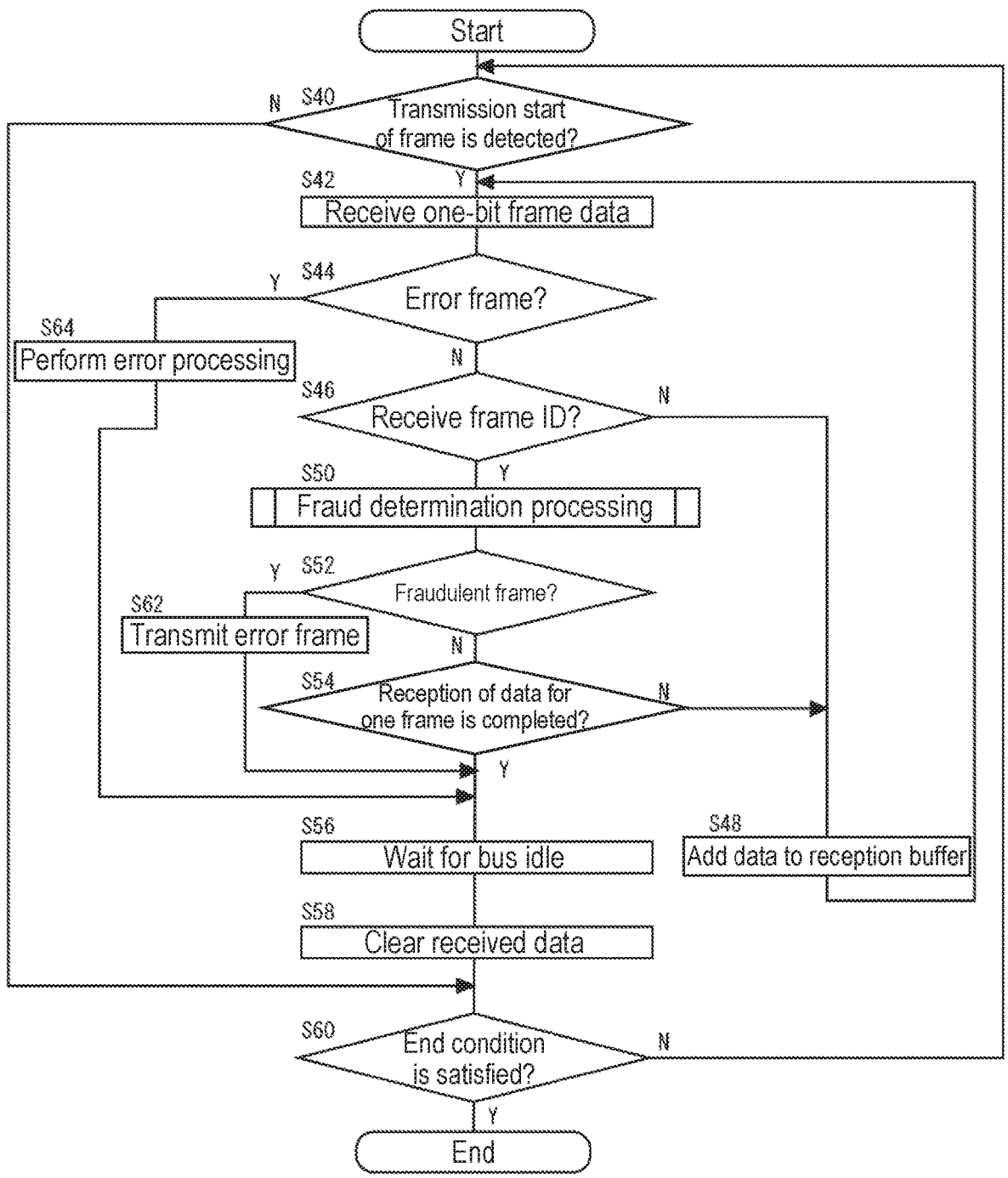
FIG. 6 is a flowchart illustrating operation of the security ECU in FIG. 1.

FIG. 6 is a flowchart illustrating the operation of security ECU 20 in FIG. 1. When detecting the transmission start of the frame in CAN 22 (Y in S40), frame transmission and reception unit 66 of security ECU 20 receives one-bit data of the frame (S42). When the received frame is not the error frame (N in S44), and when the frame ID is unreceived (N in S46), frame interpreter 68 adds the received one-bit data to reception buffer 60 (S48), and the operation returns to S42. When the frame ID is already received (Y in S46), fraud determination unit 70 performs the fraud determination processing (to be described later) (S50). When the fraud is not determined in the fraud determination processing, namely, when the received data is determined to be normal (N in S52), frame interpreter 68 determines whether the data of one frame is received.

When the reception of the data of one frame is uncompleted (N in S54), frame interpreter 68 adds the received one-bit data to reception buffer 60 (S48), and the operation returns to S42. When the reception of the data of one frame is completed (Y in S54), frame interpreter 68 waits for the bus idle of CAN 22 (S56), and clears the received data stored in reception buffer 60 (S58). The flowchart in FIG. 6 is ended when a predetermined end condition such as power off is satisfied (Y in S60), and the operation returns to S40 when the end condition is not satisfied (N in S60).

When the received data is determined to be fraudulent in the fraud determination processing (Y in S52), frame generator 72 generates the error frame, and frame transmission and reception unit 66 transmits the error frame to CAN 22 (S62). When determining that the received data is fraudulent, fraud determination unit 70 may record an error in a predetermined log, or issue an instruction to an in-vehicle infotainment (IVI) system or the like to display the error. When the received frame is the error frame (Y in S44), frame interpreter 68 performs predetermined error processing, and disposes, for example, the data of the received frame (S64). When the transmission start of the frame is undetected (N in S40), the operation skips the subsequent pieces of processing, and goes to the determination in S60.

In the exemplary embodiment, after the frame ID is received, the fraud determination processing is performed in each received one bit. Alternatively, the fraud determination processing may be performed in each plurality of bits constituting a data unit are received. Although not illustrated in FIG. 6, security ECU 20 performs the processing of updating fraud determination rule stored in rule-retaining unit 62 in cooperation with ECU 14 during starting. The detailed processing of updating the fraud determination rule will be described later with reference to FIG. 8.

Figure 7:
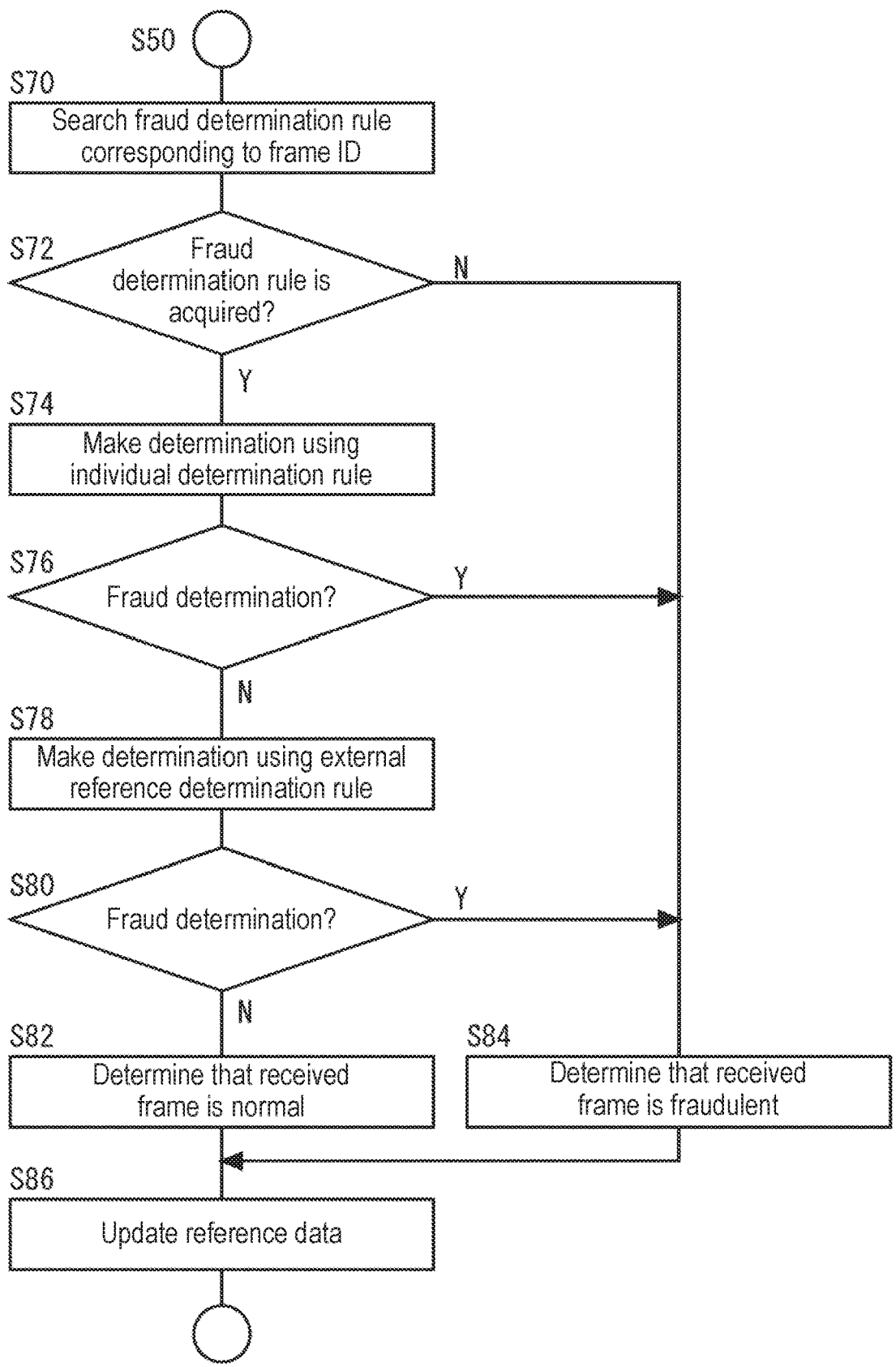
FIG. 7 is a flowchart illustrating details of fraud determination processing in S50 of FIG. 6.

FIG. 7 is a flowchart illustrating details of the fraud determination processing in S50 of FIG. 6. Fraud determination unit 70 transfers the frame ID of the received frame to rule-retaining unit 62. Rule retaining unit 62 searches the fraud determination rule matched with the frame ID transferred from fraud determination unit 70 from a retained plurality of fraud determination rules (S70). When the fraud determination rule matched with the frame ID does not exist (N in S72), fraud determination unit 70 determines that the received frame is fraudulent (S84). When the fraud determination rule matched with the frame ID exists (Y in S72), fraud determination unit 70 determines whether the received frame is fraudulent in pursuant to the individual determination rule of the fraud determination rule having the matched frame ID (S74). When the form or content of the frame deviates from a normal range defined by the individual determination rule, for example, when the frame data length is out of a permissible range defined by the individual determination rule (Y in S76), fraud determination unit 70 determines that the received frame is fraudulent (S84).

When the form or content of the frame is determined to be normal by the individual determination rule (N in S76), fraud determination unit 70 determines whether the received frame is fraudulent in pursuant to the external reference determination rule of the fraud determination rule having the matched frame ID (S78). When the form or content of the frame deviates from the normal range defined by the external reference determination rule, for example, when the determination condition defined by the reference determination rule element is not satisfied (Y in S80), fraud determination unit 70 determines that the received frame is fraudulent (S84). When the form or content of the frame is also determined to be normal by the external reference determination rule (N in S80), fraud determination unit 70 received frame determines that the received frame is normal (S82). Fraud determination unit 70 extracts the data referred to by the external reference determination rule of another frame based on the determination rule reference data information in the external reference determination rule. Fraud determination unit 70 stores the extracted data in reference data retaining unit 64 while correlating the extracted data with the determination rule reference data identifier (S86).

Figure 8:
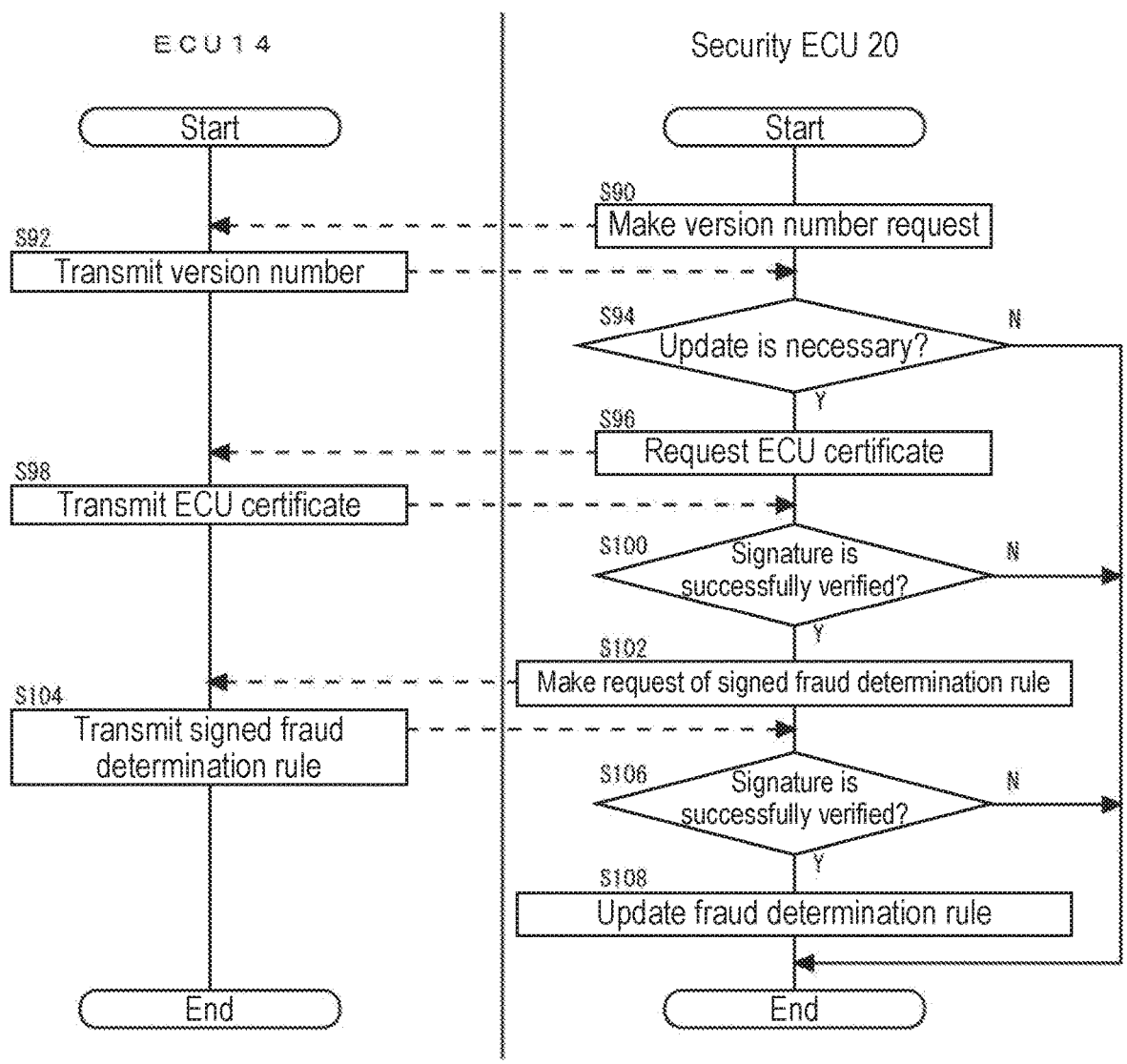
FIG. 8 is a flowchart illustrating operation of update operation of a fraud determination rule.

FIG. 8 is a flowchart illustrating operation of update operation of the fraud determination rule. In FIG. 8, the operation of ECU 14 and the operation of security ECU 20 are divided into lanes. The data transmission and the reception between ECU 14 and security ECU 20 are indicated by a broken line. Although only one ECU 14 is illustrated in FIG. 8, actually security ECU 20 performs the processing of updating the plurality of fraud determination rules corresponding to the plurality of ECUs 14 in a sequential or parallel manner.

During the power on of vehicle 10 or the starting of security ECU 20 in association with the power on of vehicle 10, frame generator 72 of security ECU 20 generates the frame (hereinafter, referred to as version request frame) to which a predetermined ID is set, the frame requesting the provision of the version number of the fraud determination rule. During the starting is the case that an ignition switch of vehicle 10 is switched from off to on. Frame transmission and reception unit 66 transmits the version request frame to CAN 22 (S90).

When frame interpreter 36 of ECU 14 detects that the version request frame is received based on the frame ID of the received frame, frame generator 40 generates the data frame (hereinafter, referred to as version notification frame) including the version value of the fraud determination rule retained by rule-retaining unit 32. The version notification frame of the exemplary embodiment includes the major version number, the minor version number, and the ECU model number. Frame transmission and reception unit 34 transmits the version notification frame to CAN 22 (S92).

When the frame ID of the received frame is the value of the version notification frame, frame interpreter 68 of security ECU 20 recognizes the received frame as the version notification frame, and transfers the version notification frame to the rule-retaining unit 62. Rule retaining unit 62 decides necessity of the update of the fraud determination rule based on the major version number and the minor version number that are indicated by the version notification frame. Rule retaining unit 62 decides that the fraud determination rule should be updated (Y in S94), frame generator 72 of security ECU 20 generates the frame (hereinafter, referred to as certificate request frame) requesting the ECU certificate. Frame transmission and reception unit 66 transmits the certificate request frame to CAN 22 (S96).

When frame interpreter 36 of ECU 14 detects that the certificate request frame is received based on the frame ID of the received frame, frame generator 40 generates the data frame (hereinafter, referred to as certificate frame) including the ECU certificate of the own ECU. Frame transmission and reception unit 34 transmits the certificate frame to CAN 22 (S98).

When the frame ID of the received frame is the value of the certificate frame, frame interpreter 68 of security ECU 20 recognizes the received frame as the certificate frame, and transfers the certificate frame to the rule-retaining unit 62. Rule retaining unit 62 verifies correctness (that is, no falsification) of the ECU certificate included in the certificate frame using the root certificate. When the correctness of the ECU certificate is confirmed (Y in S100), frame generator 72 generates the frame (hereinafter, referred to as rule request frame) requesting the signed fraud determination rule. Frame transmission and reception unit 66 transmits the rule request frame to CAN 22 (S102).

When frame interpreter 36 of ECU 14 detects that the rule request frame is received based on the frame ID of the received frame, frame generator 40 generates the data frame (hereinafter, referred to as rule frame) including the fraud determination rule and the signature that are retained by rule-retaining unit 32. For example, the signature may be data in which a hash value of the fraud determination rule is encrypted using the secret key of ECU 14. Frame transmission and reception unit 34 transmits the rule frame to CAN 22 (S104).

When the frame ID of the received frame is the value of the rule frame, frame interpreter 36 of security ECU 20 recognizes the received frame as the rule frame, and transfers the rule frame to the rule-retaining unit 62. Rule retaining unit 62 verifies the correctness of the fraud determination rule included in the rule frame based on the signature. When the correctness of the fraud determination rule is confirmed (Y in S106), rule-retaining unit 62 stores the fraud determination rule, the major version number, the minor version number, and the like, which are included in the rule frame, in a predetermined storage area (S108).

When the update of the rule is determined to be unnecessary based on the version number (N in S94), when the correctness of the ECU certificate is failed (N in S100), when the correctness of the fraud determination rule is failed (N in S106), the following pieces of processing are skipped to end the flowchart in FIG. 8. When the negative determination is made in at least one of steps S100 and S106, rule-retaining unit 62 may record the error in the predetermined log, or issue the instruction to display the error to the IVI system or the like.

In in-vehicle network system 12 of the exemplary embodiment, the fraud determination rule retained by security ECU 20 is easily updated by following the replacement of each of the installed many ECUs 14 or the change of the firm update. That is, maintenance cost of the fraud determination rule retained by security ECU 20 can be reduced. The fraud determination rule retained by security ECU 20 can efficiently be updated in appropriate timing based on the version value of the fraud determination rule retained by security ECU 20 and the version value of the fraud determination rule retained by ECU 14.

The present invention is described above based on the exemplary embodiment. It will be understood by those skilled in the art that these exemplary embodiments are merely examples, another modification in which each component and/or each piece of processing of the exemplary embodiment are variously combined can be made, and the modification still fall within the scope of the present invention.

Variations of the update of the fraud determination rule will be described as a first modification. (1) In the case that ECU 14 does not reply even if security ECU 20 requests the version number of the fraud determination rule from ECU 14, security ECU 20 may repeat the request for the version number at T-second intervals until ECU 14 replies. In the case that the reply from ECU 14 is not received even if the request is repeated N times (N is an integer of 2 or more), security ECU 20 may recognize ECU 14 of the request destination as an inactive ECU. The inactive ECU is said to be the ECU that is not normally operated, or the fraudulent ECU.

(2) In the case that ECU 14 does not reply even if security ECU 20 requests the ECU certificate or the fraud determination rule from ECU 14, security ECU 20 may repeat the request at predetermined S-second intervals until ECU 14 replies. In the case that the reply from ECU 14 is not received even if the request is repeated M times (M is an integer of 2 or more), security ECU 20 may recognize ECU 14 of the request destination as the inactive ECU. At this point, desirably $T \geq S$ and $N \geq M$ hold. It is hardly considered that the ECU certificate or the fraud determination rule cannot be acquired even if the version number is acquired. This is because a possibility of the fraudulent ECU is high, and because the fraudulent ECU is early detected.

(3) Security ECU 20 stores the ECU model number of the inactive ECU. Fraud determination unit 70 (or frame interpreter 68) of security ECU 20 refers to the fraud determination rule specified by the frame ID of the received frame, and determines that the received frame is the frame transmitted from the inactive ECU in the case that the ECU model number of the fraud determination rule is matched with the model number of the inactive ECU. Fraud determination unit 70 determines that all the frames transmitted from the inactive ECU are fraudulent irrespective of the corresponding fraud determination rule. This is because there is a high possibility of the frame transmitted from the fraudulent ECU.

A second modification will be described. In in-vehicle network system 12 of the exemplary embodiment, the processing of updating the fraud determination rule is performed during the starting associated with the power on or the like. As the second modification, security ECU 20 (for example, frame generator 72) may perform the update processing on the fraud determination rule of ECU 14 that is the replacement or update target in the case that the replacement of ECU 14 or the update of the firmware is detected.

A third modification will be described. In the exemplary embodiment, the in-vehicle network system is CAN 22. Alternatively, the in-vehicle network system may be another type of network such as Ethernet (registered trademark).

A fourth modification will be described. ECU 14 of the exemplary embodiment provides the fraud determination rule and its version to security ECU 20 in response to the request from security ECU 20. As the fourth modification, ECU 14 may spontaneously and actively perform the processing of transmitting the fraud determination rule and its version, which are stored in rule-retaining unit 32, to security ECU 20 without waiting for the request from security ECU 20 during the starting associated with the power on or the like, update of the firmware, or the replacement.

A fifth modification will be described. Security ECU 20 of the exemplary embodiment is a dedicated device that detects the fraud of the frame transmitted from ECU 14. Alternatively, as the fifth modification, the frame processing similar to ECU 14 may further be performed. That is, security ECU 20 of the fifth modification may be connected to sensor 16 or security ECU 20, and have a function of determining whether the received frame is fraudulent and a function (for example, S22 in FIG. 5) of performing the data processing based on the received frame in the case that the received frame is normal.

The techniques described in the exemplary embodiment and the modifications may be specified by the following items.

[Item 1]

A fraud detection electronic control unit is connected to another electronic control unit through an in-vehicle network system. The fraud detection electronic control unit includes a storage and a determination unit. The storage stores a first regulation for determining whether the frame transmitted from the electronic control unit is fraudulent. The determination unit determines whether the frame transmitted from the electronic control unit is fraudulent in pursuant to the first regulation. When a predetermined condition is satisfied, the storage acquires a second regulation retained by the electronic control unit and updates the stored first regulation.

In the fraud detection electronic control unit, the security of the in-vehicle network system can efficiently be improved.

[Item 2]

The storage may acquire the value of a second version of the second regulation retained by the electronic control unit, and update the stored first regulation according to the comparison result between the acquired value of the second version and the value of a first version of the first regulation previously stored in the storage.

In this aspect, the first regulation retained by the fraud detection electronic control unit can efficiently be updated.

[Item 3]

The value of the first version of the first regulation may include the value of a first major version and the value of a first minor version. The value of the second version of the second regulation may include the value of a second major version and the value of a second minor version. The storage may update the stored first regulation (1) when the value of the acquired second minor version is newer than the value of the previously stored first minor version while the value of the acquired second major version is matched with the value of the previously stored first major version. The storage may update the stored regulation (2) even if the value of the second major version is older than the value of the first major version when the value of the acquired second major version is not matched with the value of the previously stored first second major version.

In this aspect, the first regulation retained by the fraud detection electronic control unit can efficiently be updated in appropriate timing.

[Item 4]

The electronic control unit is connected to the fraud detection electronic control unit through the in-vehicle network system. The electronic control unit includes the storage and the transmission and reception unit. The storage stores the regulation for determining whether a frame transmitted onto the in-vehicle network system is fraudulent, the frame having the same frame ID (identification) as a frame transmitted from the electronic control unit. The transmission and reception unit receives the regulation transmission request from the fraud detection electronic control unit. The transmission and reception unit transmits the regulation stored in the storage to the fraud detection electronic control unit in response to the regulation transmission request, the regulation being used in order that the fraud detection electronic control unit determines whether the frame of the same frame ID as the frame transmitted from the electronic control unit is fraudulent.

In the electronic control unit, the security of the in-vehicle network system can efficiently be improved.

[Item 5]

The in-vehicle network system includes the electronic control unit and the fraud detection electronic control unit connected to the electronic control unit through the in-vehicle network system. The fraud detection electronic control unit includes a first storage, a determination unit, and a first transmission and reception unit. The first storage stores a first regulation in order to determine whether a frame transmitted from the electronic control unit is fraudulent. The determination unit determines whether the frame transmitted from the electronic control unit is fraudulent in pursuant to the first regulation. When a predetermined condition is satisfied, the first transmission and reception unit transmits a second regulation transmission request to the electronic control unit. When the predetermined condition is satisfied, the first storage acquires the second regulation retained by the electronic control unit, and updates the stored first regulation. The electronic control unit includes a second storage and a second transmission and reception unit. The second storage stores the second regulation for determining whether a frame transmitted onto the in-vehicle network system is fraudulent, the frame having the same frame ID as a frame transmitted from the electronic control unit. The second transmission and reception unit receives the second regulation transmission request, and transmits the second regulation previously stored in the second storage to the fraud detection electronic control unit in response to the second regulation transmission request.

In the in-vehicle network system, the security of the in-vehicle network system can efficiently be improved.

[Item 6]

A fraud detection method is performed by a fraud detection electronic control unit connected to another electronic control unit through an in-vehicle network system, the fraud detection electronic control unit storing a regulation for determining whether a frame transmitted from another electronic control unit is fraudulent in a storage. The fraud detection method includes determining whether a frame transmitted from the electronic control unit is fraudulent in pursuant to a first regulation. The fraud detection method includes acquiring a second regulation retained by the electronic control unit and updating the first regulation stored in the storage when a predetermined condition is satisfied.

In the fraud detection method, the security of the in-vehicle network system can efficiently be improved.

[Item 7]

A fraud detection method is performed by an electronic control unit connected to a fraud detection electronic control unit through an in-vehicle network system, the electronic control unit storing a regulation for determining whether a frame of the same frame ID as a frame transmitted from the electronic control unit is fraudulent in a storage. The fraud detection method includes receiving a regulation transmission request from the fraud detection electronic control unit. The fraud detection method includes transmitting the regulation stored in the storage to the fraud detection electronic control unit in response to the regulation transmission request, the regulation being used in order that the fraud detection electronic control unit determines whether the frame transmitted from the electronic control unit is fraudulent.

In the fraud detection method, the security of the in-vehicle network system can efficiently be improved.

[Item 8]

A computer program causes a fraud detection electronic control unit to store a first regulation for determining whether a frame transmitted from an electronic control unit is fraudulent in a storage, the fraud detection electronic control unit being connected to the electronic control unit through an in-vehicle network system. The performance caused by the computer program includes determining whether the frame transmitted from the electronic control unit is fraudulent in pursuant to the first regulation. The performance caused by the computer program includes acquiring a second regulation retained by the electronic control unit, and updating the first regulation stored in the storage when a predetermined condition is satisfied.

In the computer program, the security of the in-vehicle network system can efficiently be improved.

[Item 9]

A computer program causes an electronic control unit to store a regulation for determining whether a frame of the same frame ID as a frame transmitted from the electronic control unit is fraudulent in a storage, the electronic control unit being connected to a fraud detection electronic control unit through an in-vehicle network system. The performance caused by the computer program includes receiving a regulation transmission request from the fraud detection electronic control unit. The performance caused by the computer program includes transmitting the regulation stored in the storage to the fraud detection electronic control unit in response to the regulation transmission request, the regulating being used in order that the fraud detection electronic control unit determines whether the frame transmitted from the electronic control unit is fraudulent.

In the in-vehicle network system, the security of the in-vehicle network system can efficiently be improved.

Any combination of the exemplary embodiment and the modifications is also useful as an exemplary embodiment of the present invention. A new exemplary embodiment generated by the combination has an effect of each of the combined exemplary embodiment and modifications. Those skilled in the art understand that the function that should be fulfilled by each of components described in the claims is implemented by the single or cooperation of each of components indicated in the exemplary embodiment and modifications.

INDUSTRIAL APPLICABILITY

The present invention can be used to update the regulation detecting the fraud not only in a network of a moving body such as a vehicle but also between units connected by a general-purpose network.

REFERENCE MARKS IN THE DRAWINGS

10: vehicle
12: in-vehicle network system
14, 14a, 14b: ECU (electronic control unit)
16: sensor
18: actuator
20: security ECU (fraud detection electronic control unit)
30: reception buffer
32: rule-retaining unit ((second) storage)
34: frame transmission and reception unit ((second) transmission and reception unit)
36: frame interpreter
38: data transmission and reception unit
40: frame generator
50: fraud determination rule (regulation)
52: individual determination rule
54: external reference determination rule
60: reception buffer
62: rule-retaining unit ((first) storage)
64: reference data retaining unit
66: frame transmission and reception unit ((first) transmission and reception unit)
68: frame interpreter
70: fraud determination unit (determination unit)
72: frame generator

The invention claimed is:

1. A fraud detection electronic control unit connected to an electronic control unit through an in-vehicle network system, the fraud detection electronic control unit comprising:

a memory that stores a first regulation for determining whether a frame transmitted from the electronic control unit is fraudulent; and a processor that determines whether the frame transmitted from the electronic control unit is fraudulent in accordance with the first regulation, wherein when a predetermined condition is satisfied, the memory acquires a second regulation retained by the electronic control unit and updates the stored first regulation to the second regulation, the memory acquires a value of a second version of the second regulation retained by the electronic control unit, and updates the stored first regulation according to a comparison result between the acquired value of the second version and a value of a first version of the first regulation previously stored in the memory, the value of the first version of the first regulation includes a value of a first major version and a value of a first minor version, the value of the second version of the second regulation includes a value of a second major version and a value of a second minor version, and the memory: updates the stored first regulation when the value of the second minor version of the value of the acquired second version is newer than the value of the first minor version of the value of the previously stored first version in a case where the value of the second major version of the value of the acquired second version is matched with the value of the first major version of the value of the previously stored first version; and updates the stored first regulation even when the value of the second major version of the value of the acquired second version is older than the value of the first major version of the value of the previously stored first version in a case where the value of the second major version of the value of the acquired second version is not matched with the value of the first major version of the value of the previously stored first version.

2. A system, comprising:

an electronic control unit connected to a fraud detection electronic control unit through an in-vehicle network system, wherein the electronic control unit comprises:
  a first memory that stores a second regulation for determining whether a first frame transmitted onto the in-vehicle network system is fraudulent, the first frame having a frame ID identical to a frame ID of a second frame transmitted from the electronic control unit; and
  a first processor that receives a request for transmission of the second regulation from the fraud detection electronic control unit, and causes transmission of the second regulation stored in the first memory to the fraud detection electronic control unit in response to the transmission request for the second regulation, the second regulation being used in order that the fraud detection electronic control unit determines whether the first frame having the frame ID identical to the frame ID of the second frame transmitted from the electronic control unit is fraudulent, the fraud detection electronic control unit comprises:
  a second memory that stores a first regulation for determining whether the second frame transmitted from the electronic control unit is fraudulent; and
  a second processor that determines whether the second frame transmitted from the electronic control unit is fraudulent in accordance with the first regulation, when a predetermined condition is satisfied, the second memory acquires the second regulation retained by the electronic control unit and updates the stored first regulation to the second regulation, the second memory acquires a value of a second version of the second regulation retained by the electronic control unit, and updates the stored first regulation according to a comparison result between the acquired value of the second version and a value of a first version of the first regulation previously stored in the second memory, the value of the first version of the first regulation includes a value of a first major version and a value of a first minor version, the value of the second version of the second regulation includes a value of a second major version and a value of a second minor version, and the second memory: updates the stored first regulation when the value of the second minor version of the value of the acquired second version is newer than the value of the first minor version of the value of the previously stored first version in a case where the value of the second major version of the value of the acquired second version is matched with the value of the first major version of the value of the previously stored first version; and updates the stored first regulation even when the value of the second major version of the value of the acquired second version is older than the value of the first major version of the value of the previously stored first version in a case where the value of the second major version of the value of the acquired second version is not matched with the value of the first major version of the value of the previously stored first version.

3. The fraud detection electronic control unit according to claim 1, wherein
  the second regulation retained by the electronic control unit for determining whether the frame transmitted onto the in-vehicle network system is fraudulent, the frame having a frame ID identical to a frame ID of a second frame transmitted from the electronic control unit.

4. A non-transitory recording medium including a computer program, the computer program being for a fraud detection electronic control unit connected to an electronic control unit through an in-vehicle network system, the fraud detection electronic control unit storing, in a memory, a first regulation for determining whether a frame transmitted from the electronic control unit is fraudulent, the computer program causing the fraud detection electronic control unit to perform operations, the operations comprising:
  determining whether the frame transmitted from the electronic control unit is fraudulent in accordance with the first regulation, and
  acquiring a second regulation retained by the electronic control unit and updating the first regulation stored in the memory when a predetermined condition is satisfied,
  wherein the memory acquires a value of a second version of the second regulation retained by the electronic control unit, and updates the stored first regulation according to a comparison result between the acquired value of the second version and a value of a first version of the first regulation previously stored in the memory, the value of the first version of the first regulation includes a value of a first major version and a value of a first minor version, the value of the second version of the second regulation includes a value of a second major version and a value of a second minor version, and the memory: updates the stored first regulation when the value of the second minor version of the value of the acquired second version is newer than the value of the first minor version of the value of the previously stored first version in a case where the value of the second major version of the value of the acquired second version is matched with the value of the first major version of the value of the previously stored first version; and updates the stored first regulation even when the value of the second major version of the value of the acquired second version is older than the value of the first major version of the value of the previously stored first version in a case where the value of the second major version of the value of the acquired second version is not matched with the value of the first major version of the value of the previously stored first version.

* * * * *